Dec. 16, 1947.  G. L. ARDRON  2,432,707
CONTAINER SIDE SEAM SEALING COMPOUND APPLYING APPARATUS
Filed April 14, 1945  5 Sheets-Sheet 1

INVENTOR.
Gerald L. Ardron.
BY
Mason, Porter & Diller
ATTORNEYS.

Dec. 16, 1947.  G. L. ARDRON  2,432,707
CONTAINER SIDE SEAM SEALING COMPOUND APPLYING APPARATUS
Filed April 14, 1945  5 Sheets-Sheet 2

INVENTOR.
Gerald L. Ardron
BY
Mason, Porter & Diller
ATTORNEYS.

Dec. 16, 1947.  G. L. ARDRON  2,432,707
CONTAINER SIDE SEAM SEALING COMPOUND APPLYING APPARATUS
Filed April 14, 1945  5 Sheets-Sheet 3
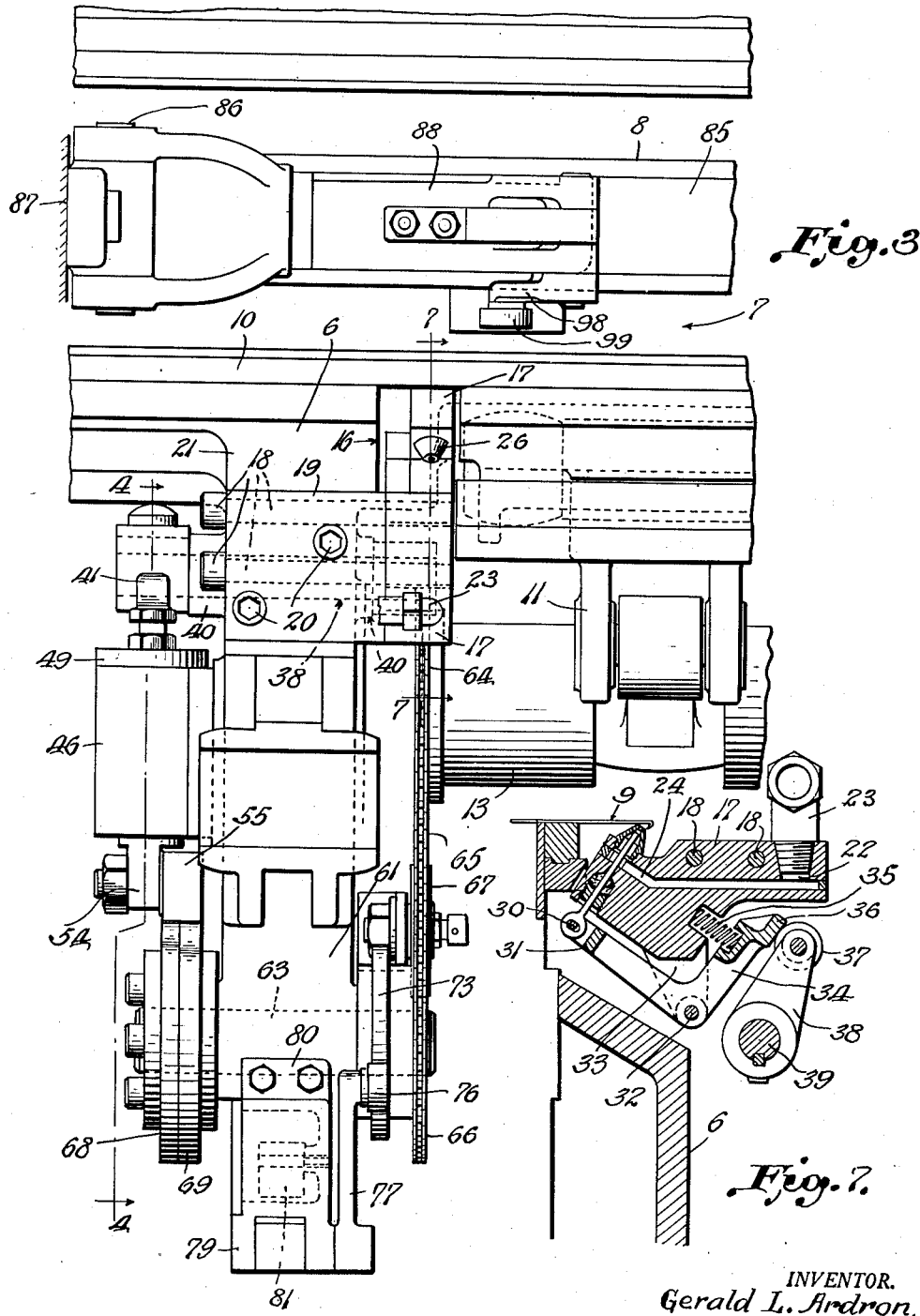
INVENTOR.
Gerald L. Ardron.
BY
Mason, Porter & Diller
ATTORNEYS.

Dec. 16, 1947.  G. L. ARDRON  2,432,707
CONTAINER SIDE SEAM SEALING COMPOUND APPLYING APPARATUS
Filed April 14, 1945  5 Sheets-Sheet 4
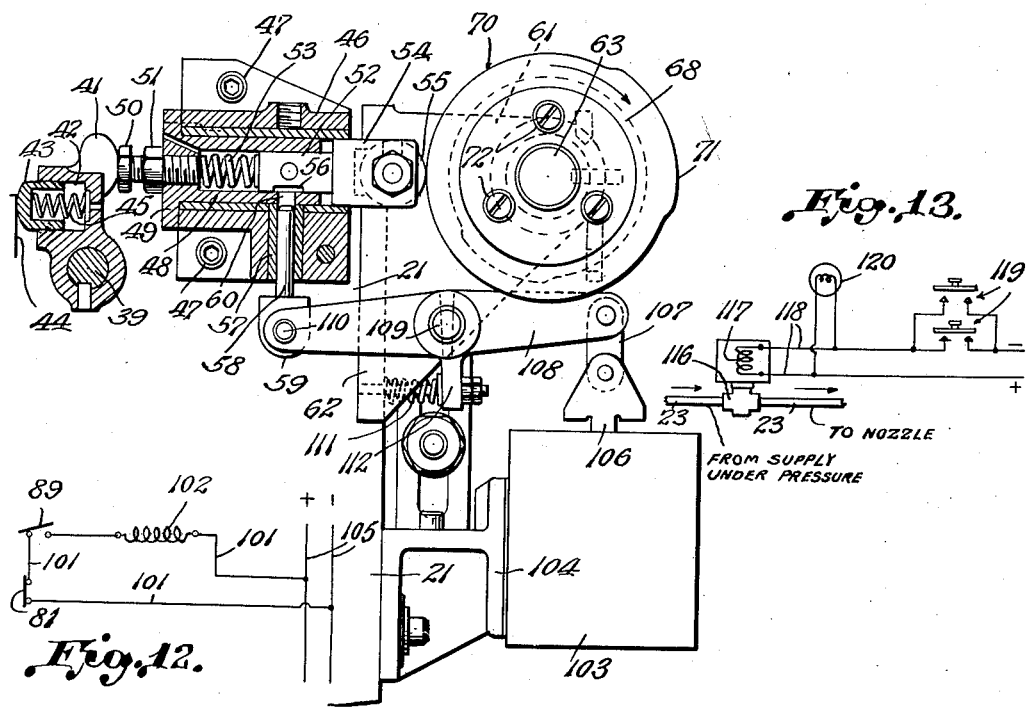
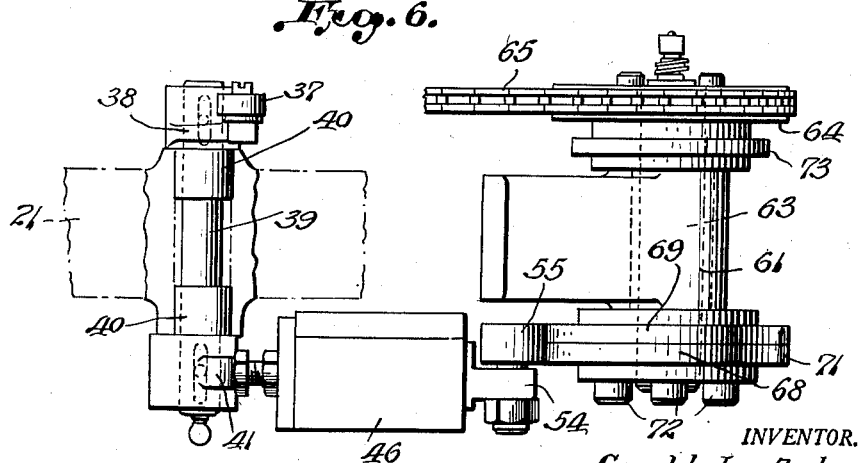
INVENTOR.
Gerald L. Ardron.
BY
Mason, Porter & Diller
ATTORNEYS.

Dec. 16, 1947.  G. L. ARDRON  2,432,707
CONTAINER SIDE SEAM SEALING COMPOUND APPLYING APPARATUS
Filed April 14, 1945  5 Sheets-Sheet 5
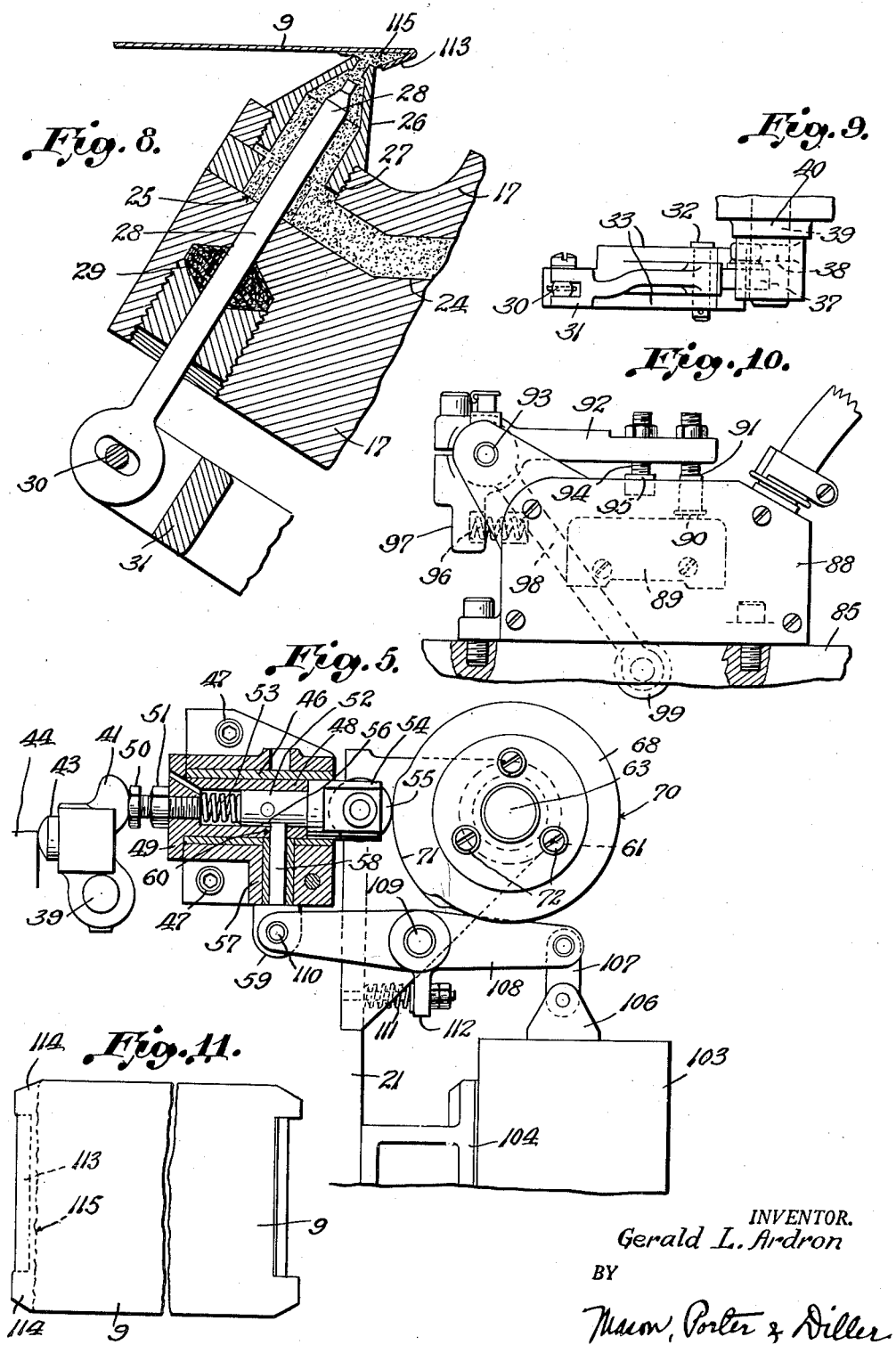
INVENTOR.
Gerald L. Ardron
BY
Mason, Porter & Diller
ATTORNEYS.

Patented Dec. 16, 1947

2,432,707

UNITED STATES PATENT OFFICE 2,432,707

CONTAINER SIDE SEAM SEALING COMPOUND APPLYING APPARATUS

Gerald L. Ardron, Seattle, Wash., assignor to Continental Can Company, Inc., New York, N. Y., a corporation of New York Application April 14, 1945, Serial No. 588,373

16 Claims. (Cl. 91—43)

1

The invention relates generally to the art of manufacturing metallic containers of the type having lock and lap side seams and it primarily seeks to provide in a container body maker a novel seam sealing compound or dope applying apparatus including an applicator nozzle and capable of so applying the dope or seam sealing compound to the body blanks as they are being fed to the forming station that both the lock and lap portions of the formed seams will have the dope or compound incorporated therein and an efficient seam seal will be provided without resorting to the usual step of solder bonding.

While the invention is not limited in practical application to incorporation in any single type of body maker, it is well adapted to incorporation in body makers of the well known Troyer-Fox type which have developed from the structures disclosed in U. S. Letters Patent to Troyer et al. 1,772,820, issued August 12, 1930. In the Troyer-Fox type machine the body blanks are withdrawn one by one from a supply stack and are fed, station by station, along supporting ways, certain operations being performed thereon at the several stations. At one station the blanks are fed from a low level feedway laterally through rolls designed to break the grain therein and then returned to a higher level feedway. At another station the blanks are notched and slit in a manner for facilitating the formation of the well known lock and lap seam. At another or so called first folding station the edge hooks later to be interlocked in the formation of the lock and lap seam are partially formed, and at the next or so called second folding station the edge hooks are finish formed. The blanks thereafter pass to the forming station whereat they are shaped about a horn and have the hooks thereof interlocked and bumped in the well known manner to complete the formation of the bodies, after which the soldering of the side seams thus formed usually is accomplished. It is the purpose of the present invention to provide novel means including an applicator nozzle for applying a seam sealing compound or dope to the outer hook and adjacent lap portions of the body blanks in position for sealing the seams and enabling completion thereof with the bumping operation, that is, without solder bonding, and the novel apparatus is incorporated in the body maker between the second folder station and the next or idle station on the left hand side.

It is an object of the invention to provide a novel dope applying means of the character stated which is simple in construction and efficient in operation and which may be readily mounted on and removed from the body maker.

In its more detailed nature the invention resides in providing a dope applying means of the character stated including a nozzle placed with its outlet in position for applying the dope to the outer hook and adjacent lap portions of each blank as the blanks are fed intermittently and in processional order toward the forming station, and means for controlling the nozzle so that dope will be delivered therefrom only during the interval of travel of each blank past said nozzle.

Another object of the invention is to provide in apparatus of the character stated means for lengthening or shortening the dope applying intervals to accord with the size of blank being formed into can bodies at a particular time.

Another object of the invention is to provide in an apparatus of the character stated novel means for preventing delivery of dope from the applicator nozzle when no body blank is in position to receive said dope.

Another object of the invention is to provide in a body maker equipped with dope applying means of the character stated and means for supplying dope thereto under pressure, control means automatically operable to cut off the supply of dope under pressure and prevent continued delivery of dope from the nozzle in the event that driving power for mechanisms of the body maker should be cut off, manually or by automatic safety shut off devices, with the nozzle in condition for delivering dope.

With the above and other objects in view that will hereinafter appear, the nature of the invention will be more clearly understood by reference to the following detailed description, the appended claims, and the several views illustrated in the accompanying drawing.

In the drawings:

Figure 3 is a fragmentary plan view illustrating the parts shown in Figure 1.

Figure 4 is a detail vertical cross section taken on the line 4—4 on Figure 3.

Figure 5 is a view like Figure 4, one nozzle control plunger part being shown as cam engaged, as for opening the nozzle, and the other plunger part being shown as latched against nozzle opening movement, as when no body blank is in position for having sealing compound applied thereon.

Figure 6 is a plan view of the parts shown in Figure 4.

Figure 7 is a fragmentary vertical cross sectional view taken on the line 7—7 on Figure 3.

Figure 8 is an enlarged fragmentary sectional view illustrating the applicator nozzle in the process of applying sealing compound to one of the hooks of a body blank.

Figure 9 is a bottom view of the nozzle carrying block and the nozzle actuating lever.

Figure 10 is an enlarged detail side elevation of the blank actuated control switch.

Figure 11 is a detail plan view of a can body blank, the sealing compound applied to one hook and the adjacent lap portions thereof being indicated in dotted lines.

Figure 12 is a diagrammatic view showing an operative connection of the nozzle control solenoid and switches.

Figure 13 is a diagrammatic view illustrating an arrangement of safety valve automatically effective to cut off the supply of sealing compound to the nozzle whenever the body maker is shut down.

In the example of embodiment of the invention herein disclosed, a novel sealing compound applying means is shown as incorporated in a body maker of the type disclosed in U. S. Letters Patent to Troyer 1,772,820, issued August 12, 1930, said apparatus being mounted just beyond the second folder station on the left hand housing in the direction of feed of the blanks toward the arch of the machine framing under which the forming station where the can bodies are formed is located.

Figure 1:
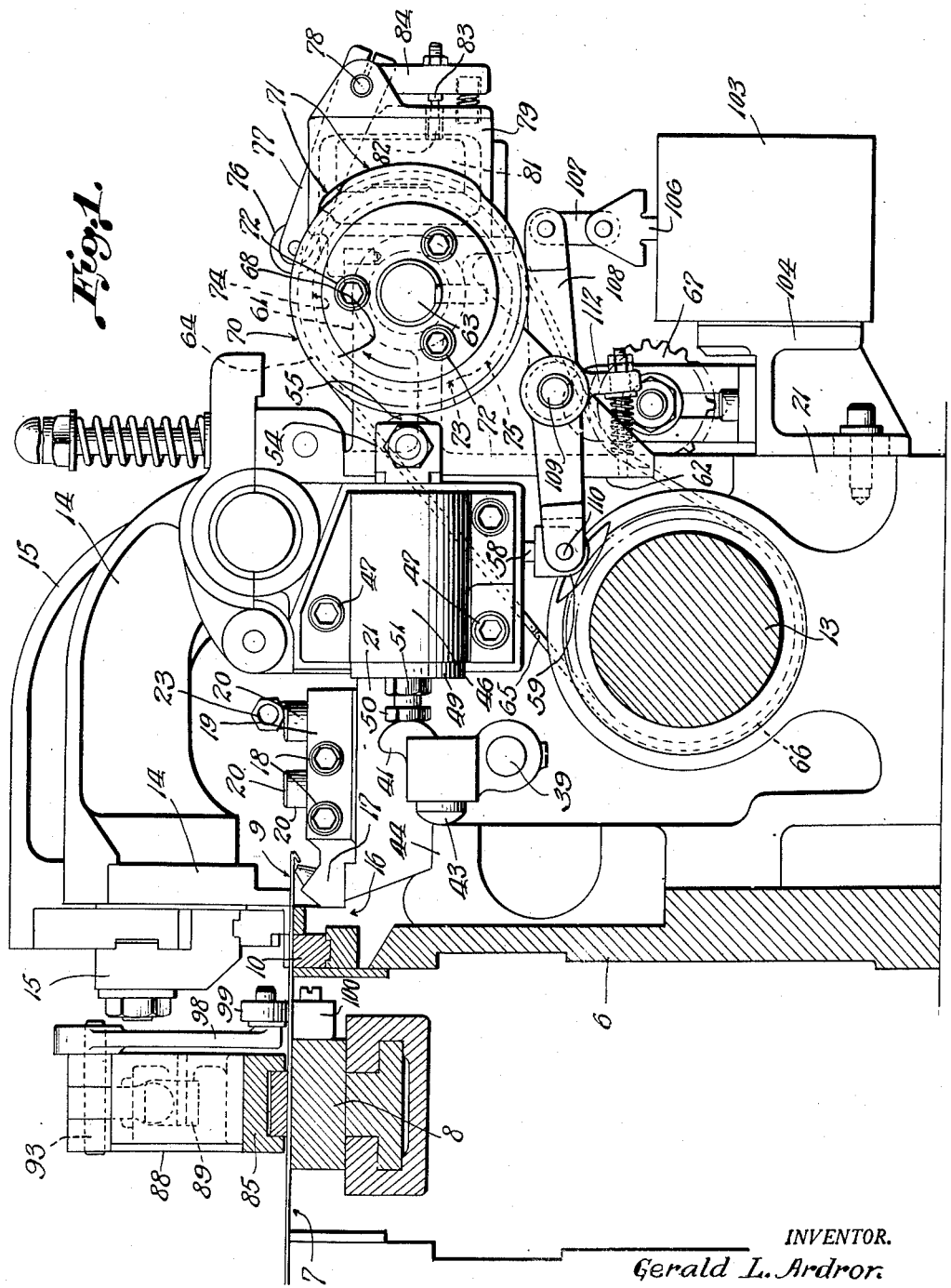
Figure 1 is a fragmentary vertical cross sectional view illustrating a portion of the blank feedway in a body maker having the invention incorporated therein.
Figure 2:
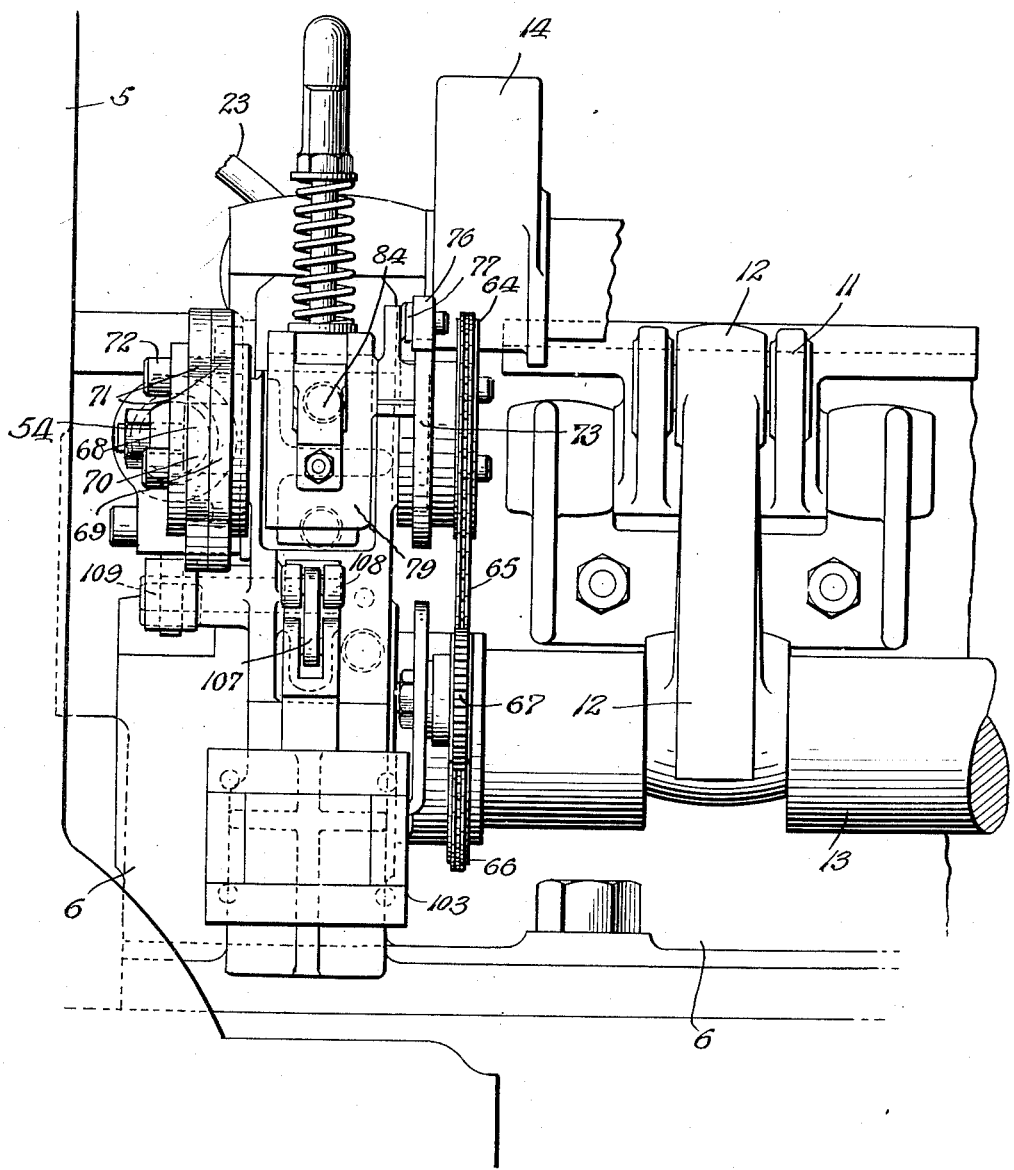
Figure 2 is a fragmentary left side elevation illustrating the parts shown in Figure 1.

Of the conventional body maker parts shown fragmentarily herein to illustrate the environment of the invention, the arch is indicated at 5, and left hand housing at 6. The feedway generally designated 7 and including the center guide bar 8 over which the can body blanks 9 are fed by the reciprocating feed bars 10 is best illustrated in Figures 1 and 2 of the drawings. The feed bars 10 feed the blanks step by step in the manner well known in the art, and said feed means may be constructed and operated in the manner illustrated in U. S. Letters Patent 1,780,049, issued to Troyer on October 28, 1930.

The second folder station or means is generally designated 11, the folding means being actuated in the well known manner by a pitman 12 connected with an eccentric on the side or cam shaft 13. See Figures 2 and 3. The well known vertically oscillatable blank clamping means and the blank stop means also are shown and are generally designated 14 and 15, respectively.

All of the body maker parts hereinabove described are conventional and well known in the art and in themselves form no part of the present invention.

In a transverse slotway 16 formed in the left hand housing 6 is mounted a nozzle block 17 which is removably secured by two screws 18 to a mounting block 19 which is in turn secured by two screws 20 on the housing extension 21. See Figures 1 and 3.

It will be apparent by reference to Figures 3 and 7 that the nozzle block 17 is provided with a supply port or inlet 22 into which the sealing compound or dope is delivered from a supply line 23 from a supply source under pressure. Through the inlet 22 the sealing compound is delivered through a duct 24 to a chamber 25 wherein the coniform nozzle tip 26 is threadably mounted as at 27. See Figure 8. A control plunger or needle valve 28 controls the delivery of sealing compound through the delivery orifice of the nozzle tip 26, and the member 28 is reciprocable through a packed gland 29 and has a slot and pin connection at 30 with the free end of one arm 31 of a bell crank lever. The bell crank lever is pivoted as at 32 in ears 33 depending from the nozzle block 17, and the other arm 34 of said lever is spring urged as at 35 in a direction for yieldably holding the control plunger in the nozzle closing position illustrated in Figure 7. The lever arm 34 is equipped with a pad 36 which is engaged with a roller 37 mounted at the free end of a crank arm 38. It will be apparent by reference to Figure 7 that the spring 35 holds the lever end 36 against the roller 37 of the crank arms, and when the crank arm is rocked to the left as viewed in Figure 7 the bell crank lever will be rocked so as to displace the control plunger 28 in the manner illustrated in Figure 8 so as to permit the sealing compound or dope to be pressure extruded from the duct 24 through the orifice in the nozzle tip 26, and after each displacement of the member 28 the nozzle will again be closed by action of the spring 35. The crank arm 38 is secured on one end of an actuator shaft 39 which is rockably mounted in a bearing 40 provided therefor in the housing extension 21. See Figures 3 and 6. At the other end of the shaft 39 another crank arm 41 is secured and said arm is chambered as at 42 to receive a plunger portion 43 which is engaged with a portion 44 of the housing and which is yieldably projected from the chamber by a cushion spring 45 interposed between the plunger and the arm 41 within said chamber. See Figure 4.

A bearing sleeve 46 is secured as at 47 to the housing extension 21 in the manner clearly illustrated in Figures 1 and 3 of the drawings, and in said sleeve is reciprocably mounted a two-part, telescoped interponent or thrust plunger including a hollow sleeve 48 having an abutment flange 49 engageable with the end of the bearing sleeve to limit inward movement of said hollow sleeve. See Figures 4 and 5. The hollow sleeve 48 also is equipped with an adjustably mounted abutment screw extension 50 disposed for engagement with the crank arm 41 and secured in its adjusted position by a jam nut 51. The two-part interponent also includes a plunger 52 slidable in the hollow sleeve 48 and opposed therein by a compression spring 53, and the plunger includes a head portion 54 which is equipped with a roller 55. The plunger also is equipped with an elongated recess 56 in its undersurface, and the purpose of this recess will become apparent as the description progresses.

The bearing sleeve 46 also is equipped with an intersecting bearing portion 57 in which a latch pin 58 is reciprocably mounted. At its lower end the pin 58 extends below the bearing portion 57 and is equipped with an actuator head 59. The upper end of the latch pin 58 is adapted to at times project into an aperture formed in the undersurface of the hollow sleeve 48. See Figure 5. It is to be understood that the compression spring 53 interposed between the parts 52 and 48 comprising the telescoped interponent or thrust plunger is heavier than the compression spring 45 mounted in the chamber 42 of the crank arm 41, and it will therefore be apparent that with the parts in the adjustment shown in Figure 4, movement to the left of the plunger 52 will impart movement to the left of the sleeve 48 with the heavy spring 53 acting as a thrust member and the lighter spring 45 yielding to permit the abutment screw 50 to rock the crank arm 41, the shaft 39 and the crank arm 38 to the left as viewed in Figures 4 and 7. When the force acting to move the parts 52 and 48 to the left is released, the spring plunger 43 will act to return said plunger parts 52, 48 and the crank arms 41 and 38 to the position illustrated in Figures 4 and 7. It will be apparent that whenever the latch pin 58 is projected into the aperture 60 in the sleeve member 48 in the manner illustrated in Figure 5, movement of the plunger 52 to the left will serve only to compress the spring 53 because the sleeve 48 will be held against movement by the latch pin. Because of the provision of the recess 56 in the plunger 52, any slight over projection of the latch pin 58 will not interfere with movement back and forth of said plunger.

A bearing member 61 is secured as at 62 to the housing extension 21 and rotatably supports a cam shaft 63. See Figures 1, 2, 3, 4 and 6. The cam shaft has a sprocket 64 secured on one end thereof and is driven by a chain 65 which passes over a sprocket 66 mounted on the side shaft 13 and engages an adjustably mounted tightener idler 67. The shaft 63 has a plate cam fixed to its other end composed of two relatively adjustable plates or rings 68 and 69, each having a concentric dwell portion 70 and a concentric raised or actuator cam portion 71. The cam members 68 and 69 are adjustably secured by screws 72 in the well known manner for permitting adjustment of the extent of the effective cam portion 71 engageable with the previously mentioned two-part, telescoped interponent or thrust plunger. Another cam member 73 is secured to the other end of the shaft 63 adjacent the sprocket 64, and this cam member includes a concentric dwell portion 74 and a concentric raised or actuator portion 75.

The cam member 73 is engageable with a roller 76 carried at the free end of a switch arm 77 which is pivoted at 78 on the switch 79, the latter being secured as at 80 on the bearing member 61. See Figures 1 and 3. The switch box 80 contains a normally open micro-switch 81 of conventional form mounted therein, the actuator plunger or button of which is engageable by an actuator pin 83 which is adjustably mounted on the actuator arm portion 84 which is movable with the switch arm 77. The purpose of the control switch 81 will become apparent as the description progresses.

The usual holddown rail 85 is mounted over the center guide bar 8 and is pivoted in the well known manner as at 86 to a fixed support 87 under the machine frame arch 5. A control switch box 88 is secured on the rail 85 in the manner illustrated in Figures 3 and 10, and a normally closed micro-switch 89 of conventional form is mounted in said box. The plunger or button 90 of said switch is engaged by an adjustably mounted actuator pin 91 depending from the free end of an arm 92 which is pivoted as at 93 on the box 88. The arm 92 also carries an adjustably mounted stop pin 94 which is engageable with a stop 95 on the switch box, being constantly urged toward said stop by a compression spring 96 interposed between the box and an extension 97 of the arm 92. A switch actuator crank 98 is operatively connected with the arm 92 and has a roller 99 mounted at the lower end thereof as illustrated in Figure 1. The roller 99 normally rests against a block 100 secured to the center guide bar 8 with its upper face at the level of the blank guiding surface of said bar and forming an accurate gage support for the blanks 9 beneath said roller.

It will be apparent by reference to Figures 1 and 10 of the drawings that each time the actuator portion 75 of the cam 73 engages the roller 76 of the actuator arm 77, the pin 83 will be moved inwardly and serve to close the normally open switch 81. It will also be apparent that each time the roller 99 is lifted by a can body blank 9 passing thereunder, the switch actuator arm 98 will be moved in a manner for releasing the actuator pin 91 and effecting an opening of the normally closed control switch 89.

Attention is directed to Figure 12 from which it will be apparent that the control switches 81 and 89 are connected in series as at 101 with the winding 102 of a solenoid 103 mounted as at 104 on the housing extension 21, and with the current source lines 105. See Figures 2 and 4. The core 106 of the solenoid is link-connected as at 107 to one end of a lever 108 which is pivoted intermediate its ends as at 109 on the bearing member 61. The other end of the lever 108 is connected as at 110 with the latch pin head 59, and a compression spring 111 interposed between the bearing member 61 and an extension 112 of the lever 108 constantly tends to pull the latch pin downwardly or retract the same from contact with the sleeve 48. Each time the solenoid winding 102 is energized by a simultaneously closed condition of both switches 81 and 89, the latch pin 58 will be lifted to the position illustrated in Figure 5 for locking the sleeve 48 in the inactive or retracted position, and as soon as the said coil is de-energized the spring 111 will restore the latch to the normally retracted position illustrated in Figures 1 and 4.

In Figure 11 of the drawings there is illustrated a can body blank 9 having the usual upwardly turned hook and the usual outer or downwardly turned hook 113 flanked at the ends by lap portions 114. The dotted line 115 indicates the line of sealing compound or dope applied to the outer or downwardly turned hook by the herein disclosed apparatus, and in Figure 8 the nozzle is shown in the process of applying said dope or sealing compound as at 115.

In the practical operation of the apparatus the two plates or rings 68 and 69 comprising the nozzle control cam are adjusted as to the relative placement of their concentric raised actuator portions 71 according to the height of the can bodies being fed through the body maker step by step by the feed bars 10 at the particular time. With these cam portions adjusted so as to be effective to hold the nozzle plunger open in the manner illustrated in Figure 8 just the right length of time to deposit the line of sealing compound or dope as indicated at 115 in Figure 11, then the switch operated cam 73 is adjusted so that its concentric raised actuator portion in acting against the switch roller 76 will lead the nozzle opening cam action by a sufficient amount to give the solenoid actuated latch pin 58 sufficient time to enter the sleeve aperture 60 in any case in which the nozzle opening mechanism is to be latched out of operation before said cam means can start its function of moving the nozzle opening devices.

So long as can bodies are properly being fed along the feedway 7 and over the center bar 8, the roller 99 will be displaced thereby so as to open the normally closed switch 89 while each can body blank 9 is passing. It will be apparent by reference to Figure 12 that the opening of this switch will render impossible completion of the circuit through the solenoid winding 102, and consequently the plunger equipment 52, 48 will be operated by the cam means to effect an application of sealing compound or dope to the outer hook and adjacent lap portions as indicated at 115 in Figures 8 and 11. However, whenever no can body blank 9 is fed into position for receiving sealing compound or dope in the outer hook thereof, or in other words in position for displacing the switch control roller 99 as aforesaid, the switch 89 will be left in its closed condition and the cam 73 will function to close the other control switch 81 just prior to engagement of the control cam portion 71 with the plunger actuating roller 55, thereby completing the circuit through the solenoid winding 102 and causing the projection of the latch pin 58 in the manner illustrated in Figure 5. Thereafter, engagement of the cam portions 71 with the plunger roller 55 will move the plunger 52 idly without imparting movement to the sleeve 48, and obviously no displacement of the sealing compound extrusion control plunger 28 will be effected. As soon as the solenoid coil 102 is de-energized by opening of the normally open switch 81, the latch pin 58 will be returned to the normal retracted position illustrated in Figure 4 and the parts will function normally to apply sealing compound to the next passing can body blank 9.

In the initial adjustment of the control switch equipment 88, 89, the parts are set in the following manner. With a can body blank 9 between the roller 99 and the gage block 100, the actuator screw 91 is adjusted to just open the normally closed micro-switch 89. The can body blank is then removed from between the roller and the block 100 and the stop screw 94 is adjusted so that the roller 99 just touches the gage block 100. With the parts thus adjusted, each time a can body blank passes beneath the roller 99, it will properly effect an opening of the normally closed micro-switch 89.

Body makers of the type herein referred to are provided with manual and some automatic devices for stopping the operation of the machine whenever it is desired to do so, or in the event of the happening of an emergent condition in the machine, such as the jamming of parts or the like. It would be possible in such a machine equipped with a sealing compound applying nozzle of the type herein disclosed that the machine stoppage would occur while the nozzle control plunger 28 is held retracted in the manner illustrated in Figure 8. Should this occur, the sealing compound being supplied under pressure through the supply line 23 would be continuously extruded from the open orifice of the nozzle tip 26. In order to assure against such objectionable delivery of sealing compound, the supply line 23 may have a normally open magnetic valve 116 connected therein in the manner illustrated in Figure 13. The coil 117 of the valve may be connected as at 118 in the supervisory circuit controlling the automatic stoppage of the machine and including the multiple of manually or automatically closable control switches 119. Obviously whenever one of the control switches 119 is closed, a circuit will be completed effective to energize the coil 117 and effect a closing of the valve 116. In this manner the pressure supply of sealing compound will be cut off and objectionable extrusion of compound through the nozzle will thus be prevented. A visible signal 120 may be connected in the supervisory circuit so as to indicate the shutting down of the machine and/or the closing of the cutoff valve 116.

While it is preferred to apply sealing compound in one hook only, namely the outer or downwardly turned hook, it will be apparent that two nozzles may be used to apply sealing compound to both hooks, or one may be used to apply sealing compound to one upwardly bent hook according to the type of body maker in which the improved apparatus is incorporated and the demands of the particular form of container body being made up.

While one form of the invention has been shown for purposes of illustration, it is to be clearly understood that various changes in the details of construction and arrangement of parts may be made without departing from the spirit and scope of the invention as defined in the appended claims.

I claim:

1. In a body maker wherein is provided a feedway and means for feeding body blanks along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as the blank is fed past said nozzle, means for supplying sealing compound to the nozzle, and cam control means operable in timed relation to the blank feeding means for intermittently operating the nozzle to cause it to accurately apply sealing compound throughout the full length of said hook and lap portions during the successive time intervals covered by the moving of individual body blanks past said nozzle, said application commencing as the advance edge of each body blank comes opposite the nozzle and terminating as the trailing edge of each blank comes opposite the nozzle.

2. In a body maker wherein is provided a feedway and means for feeding body blanks along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as the blank is fed past said nozzle, means for supplying sealing compound to the nozzle, means for intermittently operating the nozzle to cause it to accurately apply sealing compound throughout the full length of said hook and lap portions during the successive time intervals covered by the moving of individual body blanks past said nozzle, and means for varying said intermittent time intervals to adapt the applying means for applying sealing compound to blanks of different sizes.

3. In a body maker wherein is provided a feedway and means for feeding body blanks in a straight line along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as the blank is fed past said nozzle, means for supplying sealing compound to the nozzle, means for intermittently operating the nozzle to cause it to accurately apply sealing compound throughout the full length of said hook and lap portions during the successive time intervals covered by the moving of individual body blanks past said nozzle, and means for rendering said operating means ineffective whenever no body blank is being fed past said nozzle.

4. In a body maker wherein is provided a feedway and means for feeding body blanks in a straight line along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as the blank is fed past said nozzle, means for delivering sealing compound under pressure to said nozzle, and control means operable in timed relation to the feeding of blanks past the nozzle for opening the nozzle intermittently over time intervals corresponding to the passing of body blanks past said nozzle to permit pressure extrusion of the sealing compound onto the blanks accurately throughout the full length of said hook and lap portions.

5. In a body maker wherein is provided a feedway and means for feeding body blanks in a straight line along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as the blank is fed past said nozzle, means for delivering sealing compound under pressure to said nozzle, control means operable in timed relation to the feeding of blanks past the nozzle for opening the nozzle intermittently over time intervals corresponding to the passing of body blanks past said nozzle to permit pressure extrusion of the sealing compound onto the blanks accurately throughout the full length of said hook and lap portions, and means for preventing opening of the nozzle each time a body blank is not presented in position for receiving an application of sealing compound.

6. Apparatus as defined in claim 4 in which the control means includes a nozzle closing plunger and means including a rotary cam effective to bring about an opening of the nozzle as the advance edge of each body blank being fed comes opposite the nozzle and a closing of the nozzle as the trailing edge of each body blank comes opposite the nozzle.

7. Apparatus as defined in claim 4 in which the control means includes a shiftable nozzle operating interponent and a rotary cam including an interponent engaging cam portion effective to control movement of the interponent to a nozzle opening position and the holding of the interponent in the nozzle opening position during the intermittent intervals over which individual blanks move past the nozzle, there being included means for varying the length of said cam portion to adapt the apparatus for applying sealing compound to blanks of different sizes.

8. Apparatus as defined in claim 4 in which the control means includes a shiftable nozzle operating interponent and a rotary cam including an interponent engaging cam portion effective to control movement of the interponent to a nozzle opening position and the holding of the interponent in the nozzle opening position during the intermittent intervals over which individual blanks move past the nozzle, and means effective each time the blank feeding means fails to present a blank in position for receiving sealing compound from the nozzle to latch the interponent against nozzle opening movement.

9. Apparatus as defined in claim 4 in which the control means includes a shiftable nozzle operating interponent and a rotary cam including an interponent engaging cam portion effective to control movement of the interponent to a nozzle opening position and the holding of the interponent in the nozzle opening position during the intermittent intervals over which individual blanks move past the nozzle, and solenoid actuated latching means including a control circuit and a control switch actuated by blanks approaching the nozzle and effective each time the blank feeding means fails to present a blank in position for receiving sealing compound from the nozzle to latch the interponent against nozzle opening movement.

10. Apparatus as defined in claim 4 in which the control means includes a shiftable nozzle operating interponent and a rotary cam including an interponent engaging cam portion effective to control movement of the interponent to a nozzle opening position and the holding of the interponent in the nozzle opening position during the intermittent intervals over which individual blanks move past the nozzle, and solenoid actuated latching means including a control circuit and a normally closed control switch adapted to be opened by each blank as it approaches the nozzle and a second normally open switch connected with the normally closed switch in series in said circuit, and cam means effective to close the normally open switch just prior to cam shifting of the interponent and hold it closed for an interval that normally will include the opening of the nozzle by the interponent, thereby to complete the solenoid energizing circuit by simultaneous closing of both switches and effect a latching of the interponent against nozzle opening movement only when the blank feeding means fails to present a blank in position for receiving sealing compound from the nozzle.

11. Apparatus as defined in claim 4 in which the control means includes a shiftable nozzle operating interponent and a rotary cam including an interponent engaging cam portion effective to control movement of the interponent to a nozzle opening position and the holding of the interponent in the nozzle opening position during the intermittent intervals over which individual blanks move past the nozzle, and solenoid actuated latching means including a control circuit and a normally closed control switch adapted to be opened by each blank as it approaches the nozzle and a second normally open switch connected with the normally closed switch in series in said circuit, and cam means effective to close the normally open switch just prior to cam shifting of the interponent and hold it closed for an interval that normally will include the opening of the nozzle by the interponent, thereby to complete the solenoid energizing circuit by simultaneous closing of both switches and effect a latching of the interponent against nozzle opening movement only when the blank feeding means fails to present a blank in position for receiving sealing compound from the nozzle, both said cam and cam means being relatively adjustably mounted on a common shaft, there being included means for varying the length of said cam portion to adapt the apparatus for applying sealing compound to blanks of different sizes.

12. In a body maker wherein is provided a feedway and means for feeding body blanks along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as it is fed past said nozzle, means for delivering sealing compound under pressure to said nozzle, a plunger normally closing said nozzle, reciprocable lever means effective in one position to retract the plunger and bring about extrusion of sealing compound from the nozzle, a reciprocable interponent shiftable for imparting plunger retracting movement to the lever means, and rotary cam means operable in timed relation to the feeding of blanks past the nozzle for shifting the interponent to and holding the same at the nozzle opening or plunger retracting position during the passing of each blank past said nozzle so as to cause the nozzle to apply sealing compound to said hook and lap portions of each blank passing the nozzle.

13. In a body maker wherein is provided a feedway and means for feeding body blanks along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as it is fed past said nozzle, means for delivering sealing compound under pressure to said nozzle, a plunger normally closing said nozzle, reciprocable lever means effective in one position to retract the plunger and bring about extrusion of sealing compound from the nozzle, a reciprocable interponent shiftable for imparting plunger retracting movement to the lever means, rotary cam means operable in timed relation to the feeding of blanks past the nozzle for shifting the interponent to and holding the same at the nozzle opening or plunger retracting position during the passing of each blank past said nozzle so as to cause the nozzle to apply sealing compound to said hook and lap portions of each blank passing the nozzle, and means for securing the interponent against plunger retracting movement whenever the feeding means fails to present a blank in position to receive sealing compound from the nozzle.

14. Apparatus as defined in claim 13 in which the interponent comprises two yieldably telescoped plunger portions one contacted with the lever means and the other with the cam means, and in which the interponent securing means includes a shiftable latch pin engageable with the lever means contacting portion of said interponent.

15. Apparatus as defined in claim 13 in which the interponent comprises two yieldably telescoped plunger portions one contacted with the lever means and the other with the cam means, and in which the interponent securing means includes a shiftable latch pin engageable with the lever means contacting portion of said interponent, a solenoid for shifting the pin to the interponent securing position, a control circuit, a blank opened normally closed switch and a second normally open switch connected in series in said circuit, and cam means timed to close the second switch just prior to cam shifting of the interponent and hold it closed beyond the normal time of shifting of the interponent thereby to complete a solenoid energizing circuit and an interponent latching only upon failure of the feeding means to present a blank opposite the nozzle at the time of a normal nozzle open interval.

16. In a body maker wherein is provided a feedway and means for feeding body blanks along the feedway, each with a lateral edge thereof disposed in the direction of feed and equipped with a seam hook and a lap portion endwise of each end of the hook, the improvement comprising sealing compound applying means including a nozzle so disposed with relation to said feedway as to be operable to apply sealing compound in said hook and on said lap portions of each blank as it is fed past said nozzle means, means for delivering sealing compound under pressure to said nozzle, control means operable in timed relation to the feeding of blanks past the nozzle for opening the nozzle intermittently over time intervals corresponding to the passing of body blanks past said nozzle to permit pressure extrusion of the sealing compound onto the blanks, driving means for said control means, and means automatically operable upon shutting down of said drive means for cutting off of the sealing compound supplied under pressure to the nozzle thereby to prevent continued extrusion of sealing compound from the nozzle should the shut down occur during an open condition of the nozzle.

GERALD L. ARDRON.

REFERENCES CITED

The following references are of record in the file of this patent:

UNITED STATES PATENTS

| Number | Name | Date |
|---|---|---|
| 2,113,244 | Shevlin | Apr. 5, 1938 |
| 2,376,980 | Petersen et al. | May 29, 1945 |
| 2,330,880 | Gladfelter et al. | Oct. 5, 1943 |
| 2,301,847 | Beaman | Nov. 10, 1942 |
| 2,060,131 | Sosa | Nov. 10, 1936 |